United States Patent
Brown et al.

(10) Patent No.: US 7,062,612 B2
(45) Date of Patent: Jun. 13, 2006

(54) UPDATING REMOTE LOCKED CACHE

(75) Inventors: Jeffrey Douglas Brown, Rochester, MN (US); Michael Norman Day, Round Rock, TX (US); Charles Ray Johns, Austin, TX (US); James Allan Kahle, Austin, TX (US); David J. Shippy, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 10/318,594

(22) Filed: Dec. 12, 2002

(65) Prior Publication Data
US 2004/0117560 A1 Jun. 17, 2004

(51) Int. Cl.
*G06F 12/00* (2006.01)
(52) U.S. Cl. .................... 711/146; 711/144; 711/145
(58) Field of Classification Search ........ 711/144–146; 710/22–28
See application file for complete search history.

(56) References Cited

U.S. PATENT DOCUMENTS

| 5,319,766 | A | * | 6/1994 | Thaller et al. ............... 711/146 |
| 5,623,633 | A | * | 4/1997 | Zeller et al. ................. 711/146 |
| 5,920,891 | A | * | 7/1999 | Steinbach et al. ........... 711/146 |
| 6,275,885 | B1 | * | 8/2001 | Chin et al. ................... 710/311 |
| 6,636,906 | B1 | * | 10/2003 | Sharma et al. ................ 710/22 |
| 6,711,650 | B1 | | 3/2004 | Bohrer et al. |
| 2002/0062424 | A1 | * | 5/2002 | Liao et al. ................... 711/129 |
| 2004/0064648 | A1 | * | 4/2004 | Brown et al. ................ 711/137 |

* cited by examiner

*Primary Examiner*—Matthew D. Anderson
(74) *Attorney, Agent, or Firm*—Carr LLP; Diana R. Gerhardt

(57) ABSTRACT

A system and method are provided for directly accessing a cache for data. A data transfer request is sent to a system bus for transferring data to a system memory. The data transfer request is snooped. A snoop request is sent to a cache. It is determined whether the snoop request has a valid entry in the cache. Upon determining that the snoop request has a valid entry in the cache, the data is caught and sent to the cache for update.

16 Claims, 4 Drawing Sheets

UPDATING REMOTE LOCKED CACHE

BACKGROUND OF THE INVENTION

1. Field of the Invention

The invention relates generally to a memory management scheme and, more particularly, to using a cache memory with a locking feature to directly access the cache memory for data.

2. Description of the Related Art

In a large configuration computer system, applications data are transferred from a system memory to computer engines for computation. The computed data will then be transferred back to the system memory before the same set of computed data can be reused by other computing engines. In a large system configuration, there is a hierarchy of memory consisting of a system memory and one or more caches.

Generally, level one cache (L1 cache) is next to a specific computing engine and usually not shared with other computing engines in the system. Level two cache (L2 cache) is usually shared by computing engines in the system. There may be more levels of cache depending on the architecture and/or complexity of the computer system.

Typically, the time consumed by transferring data to and from a system memory becomes a big issue for system performance. If the system design is not well tuned, the computing engine will spend most of the time waiting for data availability.

Therefore, there is a need for a system and method for directly accessing a cache for data in a computer system.

SUMMARY OF THE INVENTION

The present invention provides a system and method for directly accessing a cache for data. A data transfer request is sent to a system bus for transferring data to a system memory. The data transfer request is snooped. A snoop request is sent to a cache. It is determined whether the snoop request has a valid entry in the cache. Upon determining that the snoop request has a valid entry in the cache, the data is caught and sent to the cache for update.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software and/or integrated circuits that are coded to perform such functions, unless indicated otherwise.

Figure 1:
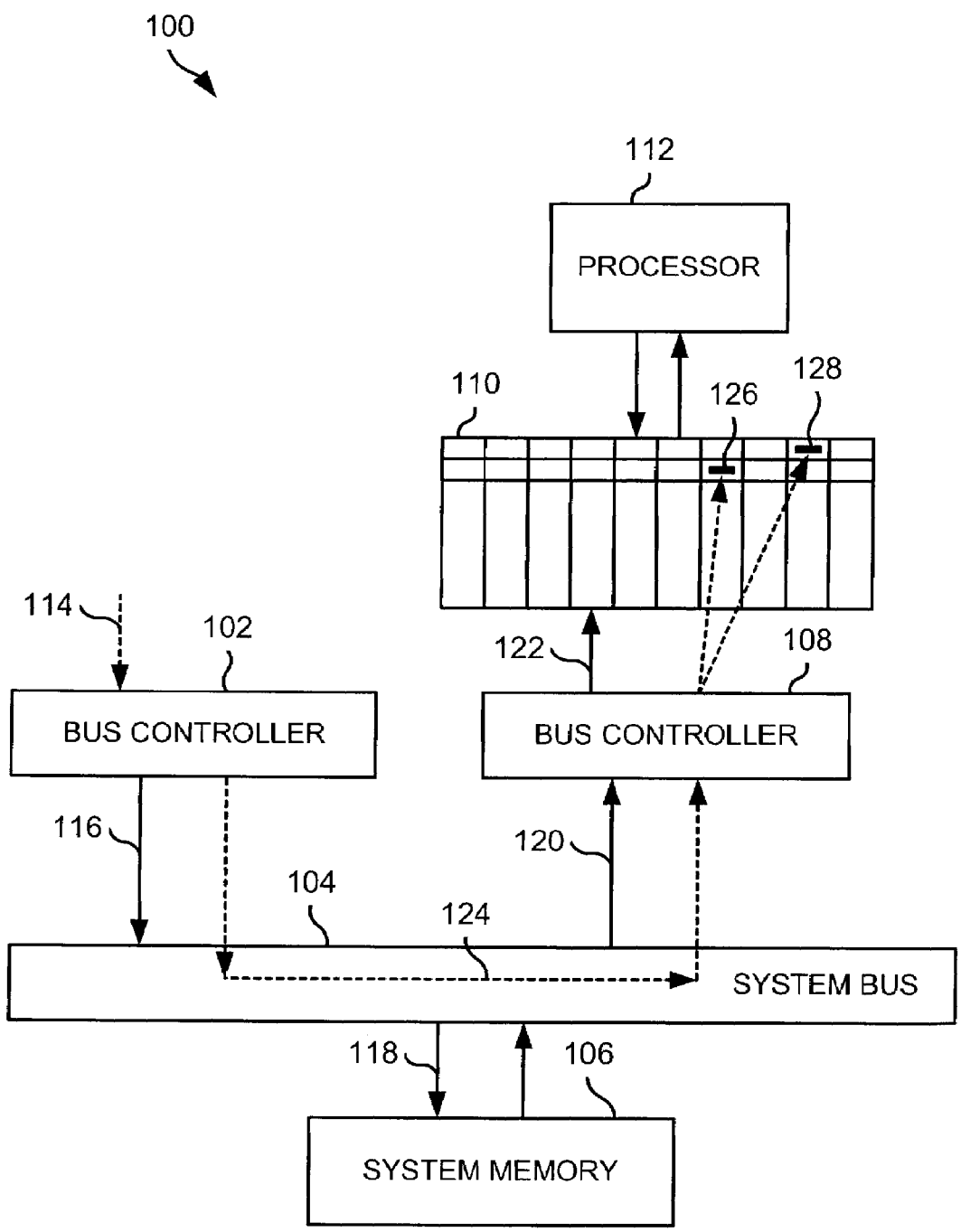
FIG. 1 is a block diagram illustrating a computer system having a single processor directly accessing a cache for data.

Referring to FIG. 1 of the drawings, the reference numeral 100 generally designates a computer system having a single processor directly accessing a cache for data. The computer system 100 comprises a first bus controller 102, a system bus 104, a system memory 106, a second bus controller 108, a cache 110, and a processor 112. The first bus controller 102 is coupled to the system bus 104. The system bus 104 is coupled to both the system memory 106 and the second bus controller 108. The second bus controller 108 is coupled to the cache 110. The cache 110 is coupled to the processor 112.

The first bus controller 102 is configured via a connection 114 to receive a request to transfer data from the first bus controller 102 to the system memory 106 via connections 116 and 118. The first bus controller 102 first sends the request to the system bus 104 via the connection 116. The second bus controller 108 snoops the request via a connection 120. The second bus controller 108 then sends a snoop request to the cache 110 via a connection 122. Preferably, the cache 110 includes a cache controller (not shown) to handle this snoop request. The cache controller then determines whether the cache 110 has a valid entry for this snoop request. If there is no valid entry for this snoop request, then the snoop request is denied. Therefore, the data is transferred on the system bus 104 via a connection 124 and is eventually stored in the system memory 106.

If there is a valid entry for this snoop request, then the second bus controller 108 catches the data from the system bus 104 when the data is being transferred on the system bus via the connection 124. The second bus controller 108 then sends the data to the cache 110 for update. In this case, the data is not stored in the system memory. Preferably, the cache 110 comprises locked cache lines for valid entries, such as valid entries 126 and 128.

Figure 2:
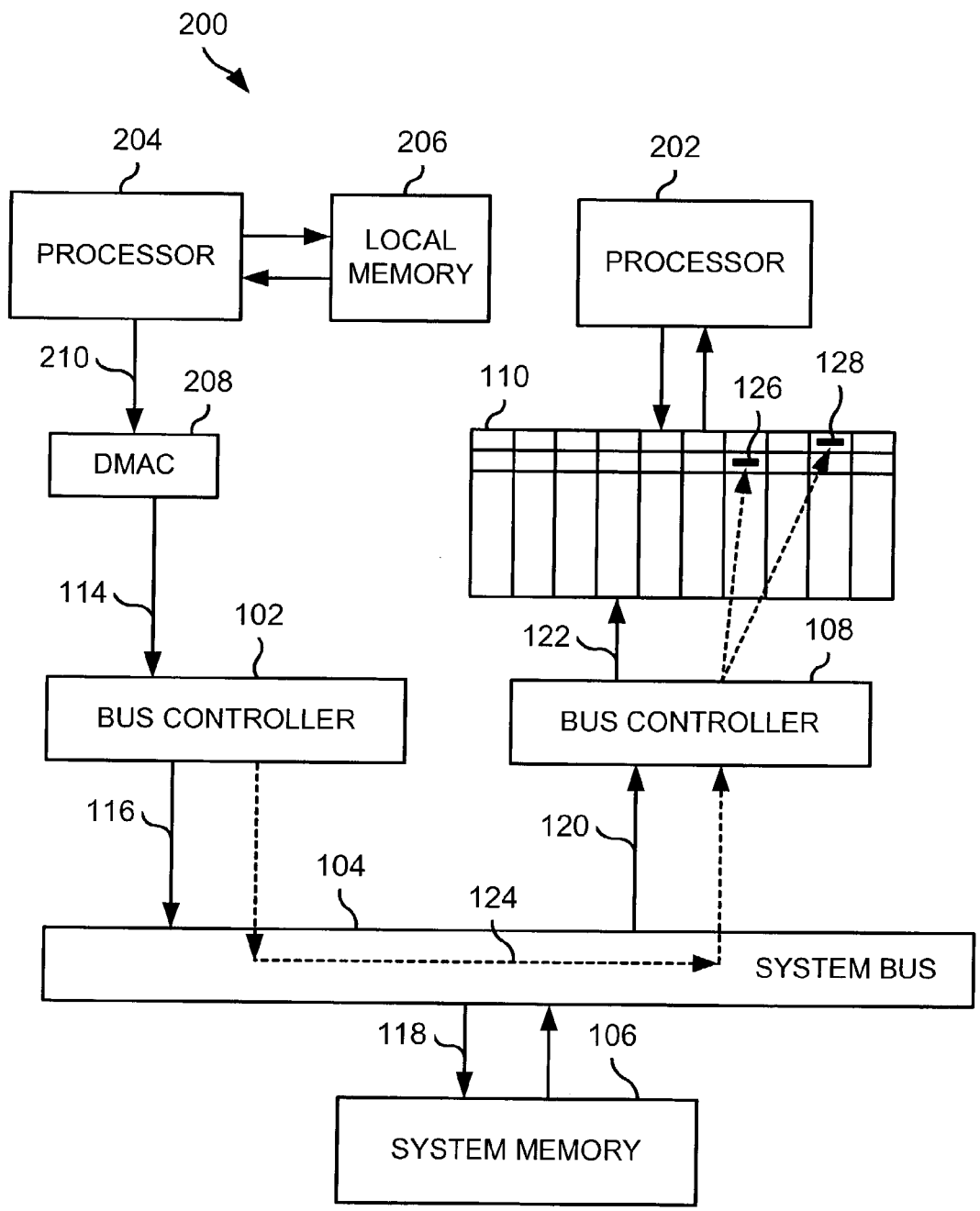
FIG. 2 is a block diagram illustrating a computer system having two processors directly accessing a cache for data.

Now referring to FIG. 2, a block diagram illustrates a computer system 200 having two processors directly accessing a cache for data. The computer system 200 includes all the components of the computer system 100 of FIG. 1 and further includes first and second processors 202 and 204, a local memory 206, and a direct memory access controller (DMAC) 208. The first processor 202 is coupled to the cache 110. The connection between the cache 110, the first and second bus controllers 102 and 108, the system bus 104, and the system memory 106 remain the same as in FIG. 1. So are the connections 114, 116, 118, 120, and 122.

The second processor 204 is coupled to both the local memory 206 and the DMAC 208. The DMAC 208 is also coupled to the first bus controller 102.

The second processor 204 sets up a DMA transfer whereby data is transferred from the local memory 206 to the system memory 106 via a connection 210. Subsequently, the DMAC 208 sends the first bus controller 102 a request for transferring the data from the local memory 206 to the system memory 106. This is done via the connection 114. The first bus controller 102 then sends the request to the system bus 104 via the connection 116. The second bus controller 108 snoops the request via the connection 120. The second bus controller 108 then sends a snoop request to the cache 110 via the connection 122. Preferably, the cache 110 includes a cache controller (not shown) to handle this snoop request. The cache controller then determines whether the cache 110 has a valid entry for this snoop request. If there is no valid entry for this snoop request, then the snoop request is denied. Therefore, the data is transferred on the system bus 104 via the connection 124 and is eventually stored in the system memory 106.

If there is a valid entry for this snoop request, then the data is read out from the local memory 206. The second bus controller 108 catches the data from the system bus 104 when the data is being transferred on the system bus via the connection 124. The second bus controller 108 then sends the data to the cache 110 for update. In this case, the data is not stored in the system memory.

The computer system 200 may be generalized to a computer system having a plurality of processors. In that case, an additional cache (not shown) and an additional bus controller (not shown) may be coupled between each additional processor (not shown) and the system bus 104 in a manner similar to the connection between the processor 202 and the system bus 104.

Figure 3:
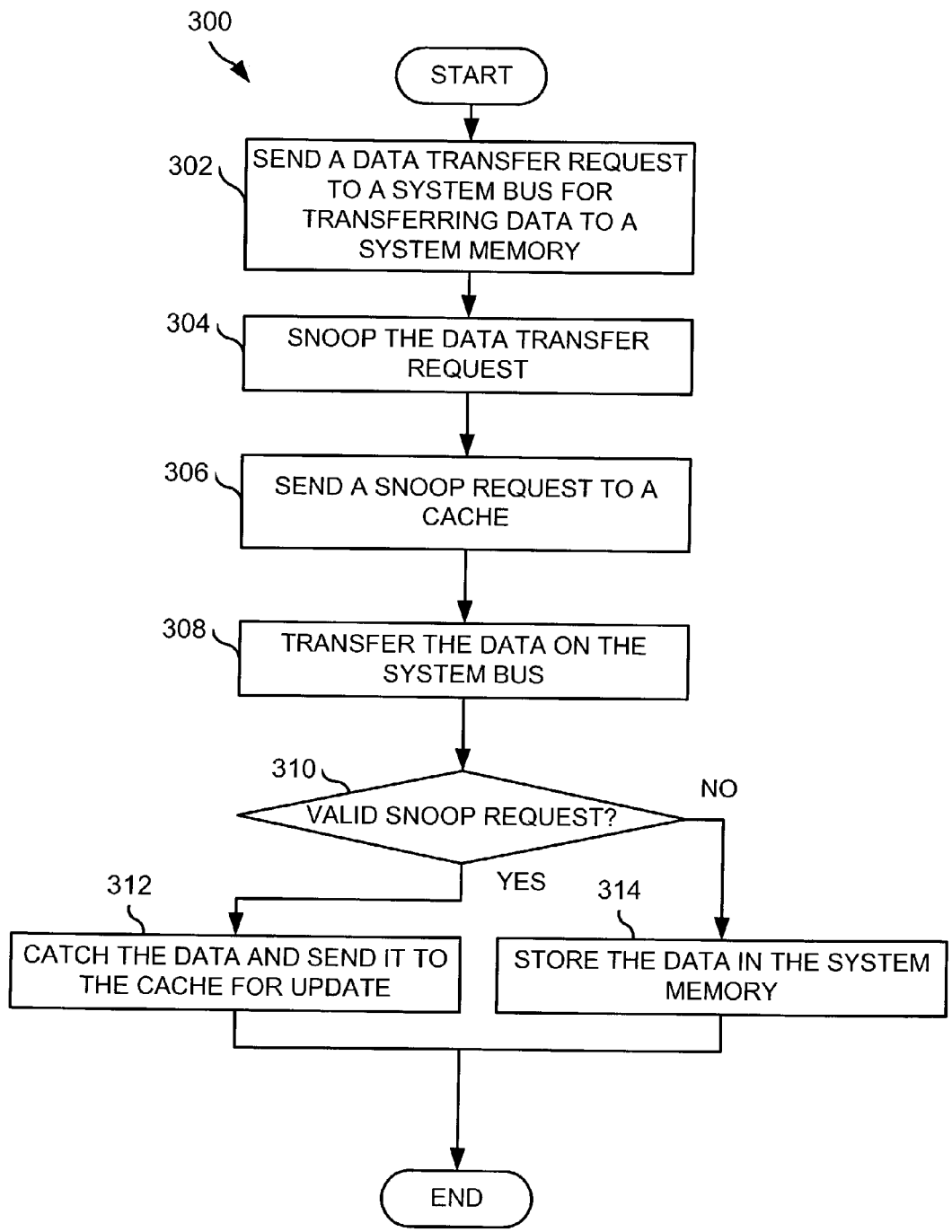
FIG. 3 is a flow diagram illustrating the operation of the computer system of FIG. 1.

In FIG. 3, a flow diagram 300 is shown to illustrate the operation of the computer system 100 of FIG. 1. In step 302, the first bus controller 102 first sends a data transfer request to the system bus 104 for transferring data to the system memory 106. In step 304, the second bus controller 108 snoops the data transfer request. In step 306, the second bus controller 108 sends a snoop request to the cache 110. In step 308, the data is transferred on the system bus 104. Preferably, the cache 110 includes a cache controller (not shown) to handle this snoop request. In step 310, the cache controller determines whether the snoop request is valid. For example, the cache 110 may be searched to find a valid entry for this snoop request. If there is no valid entry for this snoop request, then the snoop request is denied. Therefore, the data is eventually stored in the system memory 106 in step 314.

If there is a valid entry for this snoop request, then the second bus controller 108 catches the data from the system bus 104 and sends the data to the cache 110 for update in step 312. In this case, the data is not stored in the system memory.

Figure 4:
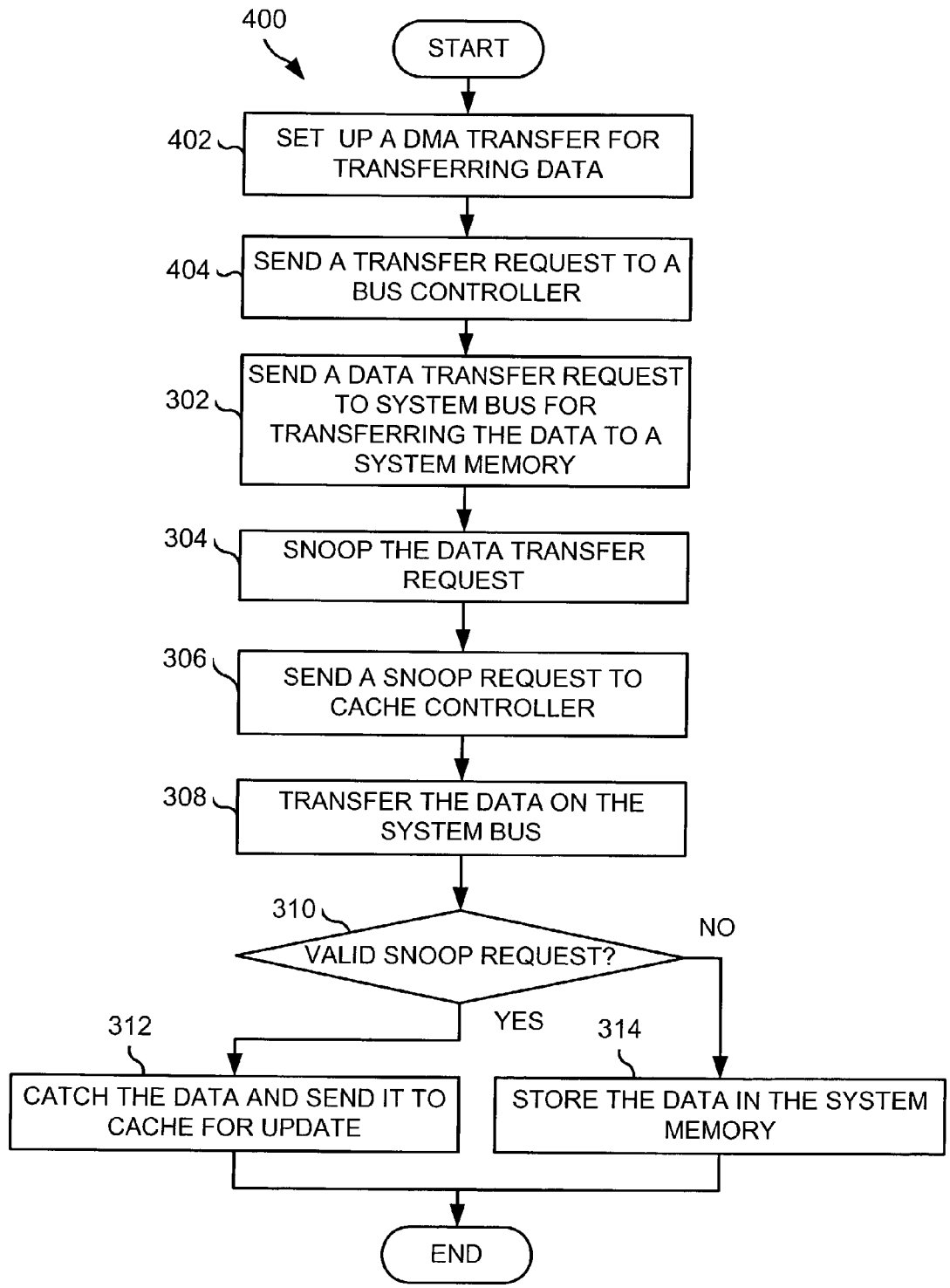
FIG. 4 is a flow diagram illustrating the operation of the computer system of FIG. 2.

In FIG. 4, a flow diagram 400 is shown to illustrate the operation of the computer system 200 of FIG. 2. In step 402, the second processor 204 sets up a DMA transfer for transmitting data from the local memory 206 to the system memory 106. In step 404, the DMAC 208 sends the first bus controller 102 a data transfer request for transferring the data from the local memory 206 to the system memory 106. Steps 302 through 314 are virtually identical as illustrated above in reference to FIG. 3.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A computer system having one or more processors and a system memory, the computer system comprising:
    a first processor;
    a cache coupled to the first processor;
    a first bus controller;
    a system bus coupled to both the first bus controller and the system memory, the first bus controller sending a data transfer request for transferring data to the system memory via the system bus;
    a second bus controller coupled to both the cache and the system bus, the second bus controller both snooping the data transfer request and sending a snoop request to the cache;
    detector means for determining whether the snoop request has a valid entry in the cache;
    data transmission means for, upon determining that the snoop request has a valid entry in the cache, catching said data from the system bus as said data is being transferred to the system memory and directly sending said data to only the cache for update to maintain a valid entry for said data in the cache, thereby enabling the first processor to directly access said data from the valid entry in the cache;
    a second processor; and
    a direct memory access controller (DMAC) coupled to both the second processor and the first bus controller.

2. The computer system of claim 1, further comprising a local memory coupled to the second processor.

3. The computer system of claim 2, wherein the second processor is configured to set up a direct memory access (DMA) transfer whereby the data is transferred from the local memory to the system memory.

4. The computer system of claim 1, wherein the DMAC is configured to send the data transfer request to the first bus controller.

5. The computer system of claim 1, further comprising means for, upon determining that the snoop request has no valid entry in the cache, storing the data in the system memory.

6. The computer system of claim 1, further comprising a cache controller.

7. The computer system of claim 6, wherein the cache controller comprises the means for determining whether the snoop request has a valid entry in the cache.

8. The computer system of claim 1, wherein the cache comprises locked cache lines for valid entries.

9. A method for directly accessing a cache for data in a computer system, the method comprising the steps of:
    setting up a direct memory access (DMA) transfer whereby the data is transferred from a local memory coupled to a processor to a system memory;
    sending a data transfer request to a bus controller;
    snooping the data transfer request;
    sending a snoop request to a cache;
    determining whether the snoop request has a valid entry in the cache; and
    upon determining that the snoop request has a valid entry in the cache, catching said data from a system bus as said data is being transferred to the system memory and directly sending said data to only the cache for update to maintain a valid entry for said data in the cache, thereby enabling a subsequent access of said data directly from the valid entry in the cache.

10. The method of claim 9, further comprising the step of directly accessing the cache for the data.

11. The method of claim 9, further comprising the steps of, upon determining that the snoop request has no valid entry in the cache, storing the data in the system memory.

12. The method of claim 9, further comprising the step of locking the data in the cache.

13. A computer program product for directly accessing a cache for data in a computer system, the computer program product having a medium with a computer program embodied thereon, the computer program comprising:

computer program code for setting up a direct memory access (DMA) transfer whereby the data is transferred from a local memory coupled to a processor to a system memory;

computer program code for sending a data transfer request to a bus controller;

computer program code for snooping the data transfer request;

computer program code for sending a snoop request to a cache;

computer program code for determining whether the snoop request has a valid entry in the cache; and computer program code for, upon determining that the snoop request has a valid entry in the cache, catching said data from the system bus as said data is being transferred to the system memory and directly sending said data to only the cache for update to maintain a valid entry for said data in the cache, thereby enabling a subsequent access of said data directly from the valid entry in the cache.

14. The computer program product of claim 13, the computer program further comprising computer program code for directly accessing the cache for the data.

15. The computer program product of claim 13, the computer program further comprising computer program code for, upon determining that the snoop request has no valid entry in the cache, storing the data in the system memory.

16. The computer program product of claim 13, the computer program further comprising computer program code for locking the data in the cache.

* * * * *